(12) United States Patent
Degner et al.

(10) Patent No.: US 11,953,952 B2
(45) Date of Patent: Apr. 9, 2024

(54) PARALLEL MOTION TRACKPAD

(71) Applicant: Apple Inc., Cupertino, CA (US)

(72) Inventors: Brett W. Degner, Menlo Park, CA (US); Thomas R. Matzinger, Los Osos, CA (US); Bradley J. Hamel, San Carlos, CA (US); Ryan P. Brooks, Menlo Park, CA (US); Scott J. Krahn, Los Gatos, CA (US); Arka P. Roy, Campbell, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/814,454

(22) Filed: Jul. 22, 2022

(65) Prior Publication Data
US 2022/0365558 A1    Nov. 17, 2022

Related U.S. Application Data

(63) Continuation of application No. 16/797,971, filed on Feb. 21, 2020, now Pat. No. 11,429,157.

(51) Int. Cl.
| | |
|---|---|
| *G06F 1/16* | (2006.01) |
| *G06F 3/01* | (2006.01) |
| *G06F 3/0338* | (2013.01) |
| *G06F 3/0354* | (2013.01) |
| *G06F 3/041* | (2006.01) |
| *G06F 3/04883* | (2022.01) |

(52) U.S. Cl.
CPC .............. *G06F 1/169* (2013.01); *G06F 3/016* (2013.01); *G06F 3/0338* (2013.01); *G06F 3/03547* (2013.01); *G06F 3/0414* (2013.01); *G06F 3/04142* (2019.05); *G06F 3/04883* (2013.01); *G06F 2203/04808* (2013.01)

(58) Field of Classification Search
CPC ................. G06F 3/03547; G06F 1/169; G06F 2203/04105; G06F 3/016; G06F 3/041; G06F 3/0414; G06F 3/044; G06F 3/03541; G06F 3/0354; G06F 2203/04808
See application file for complete search history.

(56) References Cited

U.S. PATENT DOCUMENTS

| | | | |
|---|---|---|---|
| 8,441,450 B2 | 5/2013 | Degner et al. | |
| 8,860,671 B2 | 10/2014 | Jung et al. | |
| 9,069,394 B2 * | 6/2015 | Clayton | G06F 3/03547 |
| 9,921,692 B2 | 3/2018 | Tan et al. | |
| 10,824,252 B1 * | 11/2020 | Huang | H05K 1/181 |

(Continued)

FOREIGN PATENT DOCUMENTS

| | | |
|---|---|---|
| CN | 102713805 A | 10/2012 |
| CN | 104798018 A | 7/2015 |

(Continued)

*Primary Examiner* — Dismery Mercedes
(74) *Attorney, Agent, or Firm* — Dorsey & Whitney LLP

(57) ABSTRACT

An input device includes a touch plate having a central axis and a top surface with three outer points evenly spaced away from the central axis. A touch sensor is used to detect a user touch on the top surface at the first outer point, and a support mechanism supports the touch plate and is configured to translate the touch plate at the second and third outer points upon application of the user touch and translation of the touch plate at the first outer point. Translation of the three outer points is substantially equal along the central axis.

20 Claims, 6 Drawing Sheets

(56) References Cited

U.S. PATENT DOCUMENTS

| | | | |
|---|---|---|---|
| 11,442,562 B2* | 9/2022 | Li | G06F 3/03547 |
| 2010/0079404 A1* | 4/2010 | Degner | G06F 3/042 |
| | | | 345/173 |
| 2011/0141052 A1 | 6/2011 | Bernstein et al. | |
| 2012/0103773 A1* | 5/2012 | Villain | G06F 3/03547 |
| | | | 200/344 |
| 2014/0009441 A1 | 1/2014 | Bernstein et al. | |
| 2014/0111914 A1 | 4/2014 | Leggett et al. | |
| 2014/0286302 A1 | 9/2014 | Khoryaev et al. | |
| 2015/0009156 A1* | 1/2015 | Hsueh | H01H 3/125 |
| | | | 345/173 |
| 2015/0185769 A1* | 7/2015 | Takata | G06F 1/169 |
| | | | 345/173 |
| 2015/0286295 A1* | 10/2015 | Pepe | G06F 3/0362 |
| | | | 345/163 |
| 2017/0153703 A1* | 6/2017 | Yun | G06F 3/016 |
| 2017/0285848 A1 | 10/2017 | Rosenberg et al. | |
| 2017/0322591 A1 | 11/2017 | Lee et al. | |
| 2019/0087062 A1* | 3/2019 | Polishchuk | G06F 3/0488 |
| 2019/0348983 A1 | 11/2019 | Edgar et al. | |
| 2019/0369729 A1* | 12/2019 | Krumpelman | G06F 3/016 |
| 2019/0369759 A1* | 12/2019 | Costante | G06F 3/0414 |
| 2021/0096647 A1* | 4/2021 | Amin-Shahidi | G06F 3/016 |

FOREIGN PATENT DOCUMENTS

| | | |
|---|---|---|
| CN | 105786180 A | 7/2016 |
| CN | 110291492 A | 9/2019 |
| KR | 20160061180 A | 5/2016 |

\* cited by examiner

PARALLEL MOTION TRACKPAD

CROSS-REFERENCED TO RELATED APPLICATION(S)

This application is a continuation of U.S. patent application Ser. No. 16/797,971, filed Feb. 21, 2020, and titled "Parallel Motion Trackpad," the disclosure of which is hereby incorporated herein by reference in its entirety.

FIELD

The described embodiments relate generally to input devices for computers. More particularly, the present embodiments relate to trackpad input device support and motion control.

BACKGROUND

There exist today many styles of input devices for performing input operations in electronic devices. The operations generally correspond to moving a cursor and making selections on a display screen. By way of example, such input devices may include buttons, switches, keyboards, mice, trackballs, touch pads, joysticks, touch screens, and the like. Each of these devices has advantages and disadvantages that are taken into account when designing the consumer electronic device. In handheld computing devices, the input devices are generally selected from buttons and switches. Buttons and switches are generally mechanical in nature and provide limited control with regards to the movement of a cursor (or other selector) and making selections. For example, they are generally dedicated to moving the cursor in a specific direction (e.g., arrow keys) or to making specific selections (e.g., enter, delete, number, etc.).

In portable computing devices such as laptop computers, the input devices are commonly trackpads (also known as touch pads). With a trackpad, the movement of an input pointer (i.e., cursor) corresponds to the relative movements of the user's finger (or stylus or other compatible object) as the finger is moved along a surface of the trackpad. Trackpads can also make a selection on the display screen when one or more taps are detected on the surface of the track pad. In some cases, any portion of the trackpad may be tapped, and in other cases a dedicated portion of the trackpad may be tapped. In stationary devices such as desktop computers, the input devices are generally selected from mice, trackballs, or peripheral trackpads. Trackpads can also receive touch gestures in which a user slides multiple fingers across the trackpad to initiate different functions such as scrolling or zooming. Makers and users of these devices are in constant need for improvements and enhancements that improve the overall user experience.

SUMMARY

An aspect of the disclosure relates to a trackpad device comprising a touch plate having a central axis and a top surface, with the central axis being perpendicular to the top surface and with the top surface having a first outer point, a second outer point, and a third outer point each evenly spaced away from the central axis on the top surface. The trackpad device can also include a touch sensor to detect a user touch on the top surface at the first outer point and a support mechanism supporting the touch plate. The support mechanism can be configured to translate the touch plate at the second and third outer points upon application of the user touch and translation of the touch plate at the first outer point, wherein translation of the first, second, and third outer points can be substantially equal along the central axis.

In some embodiments, the trackpad device can further comprise a switch to transduce movement of the touch plate along the central axis. The first, second, and third outer points can be positioned in corners of the top surface of the touch plate. A first downward force required to translate the touch plate at the first outer point can be substantially equal to a second downward force required to translate the touch plate at the second outer point and equal to a third downward force required to translate the touch plate at the third outer point.

In some embodiments, the trackpad device can further comprise a base, wherein the support mechanism can comprise at least two arm portions each being pivotally connected to the touch plate, pivotally connected to the base, and connected to each other at a central pivot. In some embodiments, the at least two arm portions can be each pivotally connected to the touch plate at a radially outer end of the respective arm portion and the at least two arm portions can be each pivotally connected to the base between the radially outer ends and the central pivot.

Another aspect of the disclosure relates to a computer input device comprising a substrate, a trackpad mechanism, and a touch sensor to sense a position of a user touch on the trackpad plate. The trackpad mechanism can be coupled to the substrate and can comprise a trackpad plate and a hinge mechanism movably supporting the trackpad plate above the substrate and comprising at least two arm portions, with each of the at least two arm portions including: a first rotatable connection to the substrate, a second rotatable connection to the trackpad plate, and a third rotatable connection to another arm portion of the at least two arm portions. The first rotatable connection can be positioned between the second and third rotatable connections, the second rotatable connection can be positioned at an outer portion of the trackpad plate, and the third rotatable connection can be positioned at a central portion of the trackpad plate.

In some embodiments, at least one of the first, second, and third rotatable connections comprises a living hinge or a pivot hinge. The second rotatable connection can define a first axis of rotation of the hinge mechanism relative to the trackpad plate, and each of the at least two arm portions can include a fourth rotatable connection to the substrate, wherein the first and fourth rotatable connections can be aligned along a second axis of rotation that is parallel to the first axis of rotation. In some embodiments, the hinge mechanism can comprise at least two layers of material attached to each other. The outer portion of the trackpad plate can be a corner of the trackpad plate.

In some embodiments, the computer input device can further comprise a deflectable switch configured to be actuated upon translation of the trackpad plate relative to the substrate. The trackpad plate can comprise a rigid frame attached to the trackpad plate and the second rotatable connection of each of the at least two arm portions can be a connection to the rigid frame.

Yet another aspect of the disclosure relates to an input device comprising an enclosure having an outer edge, a keyboard in the enclosure, and a trackpad in the enclosure between the keyboard and the outer edge, with the trackpad including a touch surface having a keyboard-side portion adjacent to the keyboard an outer-side portion adjacent to the outer edge, a touch sensor to detect an object at the touch surface, and a hinge mechanism. Application of a downward force at the keyboard-side portion or the outer-side portion of the touch surface can induce vertical displacement of the keyboard-side portion of the touch surface equal to vertical displacement of the outer-side portion of the touch surface via the hinge mechanism.

In some configurations, the keyboard-side portion can be oriented parallel to the outer-side portion of the touch surface. The hinge mechanism can comprise a pair of centrally-joined wings. The hinge mechanism can comprise a set of parallel pivot portions connecting the hinge mechanism to the enclosure. In some embodiments, the vertical displacement of the touch surface can induce a force feedback having a click ratio. A switch can be positioned between the hinge mechanism and the touch sensor.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
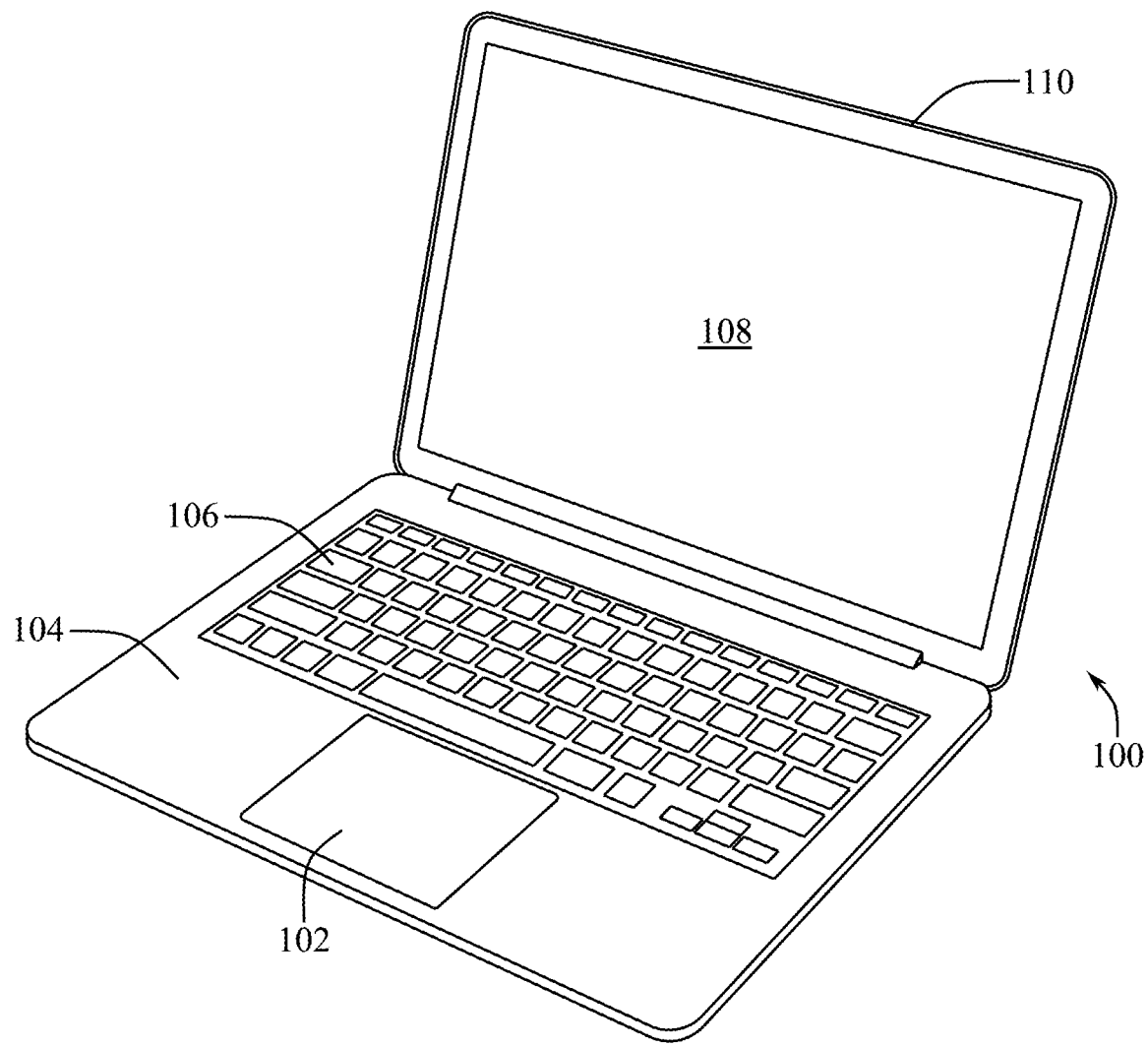
FIG. 1 shows a perspective view of a computing system according to an embodiment of the present disclosure.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to trackpads and related touch-based input devices for computers such as laptops, notebooks, tablets, and related devices and accessories. Although some trackpads implement capacitive touch sensors and force sensors, they may not be as intuitive and comfortable to use if they do not provide feedback to the user when a touch or downward force is applied by the user. Accordingly, conventional trackpads have been accompanied by a clickable, tactile button or an electronic haptic feedback system configured to vibrate the user's finger in response to pressing the tracking surface itself. Generally, the diminishing size of electronic devices, and especially portable electronic devices, makes the addition of a button undesirable due to lack of available surface area on a housing. Also, the area in which a button is implemented can often be more beneficially used as additional area for receiving touch and gesture input. In devices with an electronic haptic feedback system, the cost of the system, the size of its components, and its requirement for electrical power all make that source of feedback less desirable for some applications.

Some conventional trackpad devices have used a movable trackpad, wherein the trackpad itself is rotatable upon application of the user's downward force. This type of trackpad can be referred to as a "diving board" or similar configuration since it is pivotally connected along one edge of its rectangular shape to a hinge. The "diving board" trackpad can have a low threshold click force (i.e., the force required to trigger a click input) at one end of the trackpad, but it can have a very high threshold click force at the other end thereof. Accordingly, a user may find it much easier to click far from the hinge-supporting edge of the trackpad, but the user may find it difficult to click nearby the hinge-supporting edge. This detracts from the user experience and makes portions of the trackpad less effective and comfortable to use than other portions.

Aspects of the present disclosure relate to trackpads that are low-cost, have low power requirements, and are effective and comfortable to use at all points on the touch surface. The trackpad can comprise a touch plate or cover that the user touches, a touch sensor configured to detect the position of a touch on the plate or cover, and a support mechanism supporting the cover so that it translates along a vertical axis with substantially no rotation of the top surface, even when the user provides a downward force to "click into" the surface of the trackpad at multiple different ends of the trackpad. This feature can manifest in various embodiments.

For example, the support mechanism can be configured to equally vertically translate the cover at at least three different evenly-spaced-apart points on the top surface when a downward force is applied to one of the three points. Thus, the trackpad can require a single magnitude of downward force to translate the cover at at least three points that are equally spaced from the center of the trackpad. The at least three points can be positioned on a substantially circular or elliptical line centered at or near the middle of the trackpad. A series of other concentric and substantially circular or elliptical lines can be positioned radially within or outward from that line, wherein along each line, there are a continuous set of input points at which the cover evenly deflects when a downward force is applied to one of the input points. In some embodiments, this movement of the trackpad cover can be referred to as "parallel motion" since the top surface of the cover remains substantially parallel to a support surface below the trackpad or a surface surrounding the borders of the trackpad while the cover moves, unlike a "diving board"-type trackpad that rotates or pivots about one outer edge when its top surface moves and therefore tilts and loses its parallel orientation relative to the support surface.

In some embodiments, the parallel motion of the cover is defined by opposite side portions of the touch surface moving with equal vertical displacement when a downward force is applied to one of the opposite sides. For example, in a trackpad positioned adjacent to a keyboard in a laptop computer, the trackpad can have a keyboard-side portion and an outer-side portion positioned opposite the keyboard-side portion. The trackpad can be configured to vertically move with equal displacement at the keyboard-side portion and the outer-side portion whether the user pressed on the keyboard-side portion or on the outer-side portion thereof.

The support mechanism can comprise a pivotable mechanism that stabilizes the movement of the cover by transferring a downward force on one side of the central axis of the cover to also pull down the cover on an opposite side of the central axis. To implement this function, the support mechanism can comprise a pair of rotatable wings or arms that are rotatably joined to each other at one end in the middle of the trackpad and that are rotatably joined to the cover (or a touch sensor assembly that is joined to the cover) at their opposite ends near the edges or corners of the trackpad. The wings or arms can be rotatably attached to a chassis, substrate, or other base support (e.g., a housing of the input device) between their ends. Thus, when a downward force is applied to one side of the cover, can cause one wing or arm to rotate downward at an outer end thereof and to rotate upward at an inner/central end thereof. The other wing or arm then rotates upward at the inner/central end since it is joined to the first wing or arm, and the rotation of the inner/central end causes the outer end of the second wing or arm to rotate downward, thereby pulling the cover down on the opposite side of the trackpad relative to where the input force is applied.

In some cases, a switch can be positioned between the cover and a support surface to which the support mechanism is attached, and the switch can provide a predetermined amount of force feedback to the user as the cover is moved by the downward force. For example, the switch can comprise a collapsible or compressible dome configured to transition between two stable conditions when depressed in order to provide a tactile force-feedback profile to the user through the cover. In some embodiments, the switch can be actuated by the support mechanism, such as by being compressed between the support mechanism and the cover of the trackpad. In some cases, the switch can be actuated by being compressed between the cover and the chassis or housing of the input device.

These and other embodiments are discussed below with reference to FIGS. 1 through 13. However, those skilled in the art will readily appreciate that the detailed description given herein with respect to these figures is for explanatory purposes only and should not be construed as limiting.

FIG. 1 illustrates a perspective view of a computing system 100 according to an embodiment of the present disclosure. The computing system 100 can include an input device 102 positioned in a lower enclosure 104 that also includes a keyboard 106. The computing system 100 can also include a display 108 in an upper enclosure 110. The system 100 can be a notebook or laptop computer, wherein the display 108 and upper enclosure 110 are pivotally connected to the lower enclosure 104 and one of the enclosures 104, 110 includes a computer processor, memory, electronic storage device, and other related computer components (not shown). In some embodiments, the system 100 can comprise a tablet computer, wherein the upper enclosure 110 can be a tablet device in which the processor, memory, storage, and other related computer components are positioned, and the lower enclosure 104 can be an extension of the upper enclosure 110 or a cover, case, or accessory that is reversibly attachable/detachable from the upper enclosure 110. In some cases, the system 100 can omit the display 108 and upper enclosure 110. In some cases, the input device 102 can be positioned in its own enclosure (i.e., the input device 102 can be its own "peripheral" device connected remotely to a computing device), and the keyboard 106 can be omitted or used in its own, separate enclosure.

Figure 2:
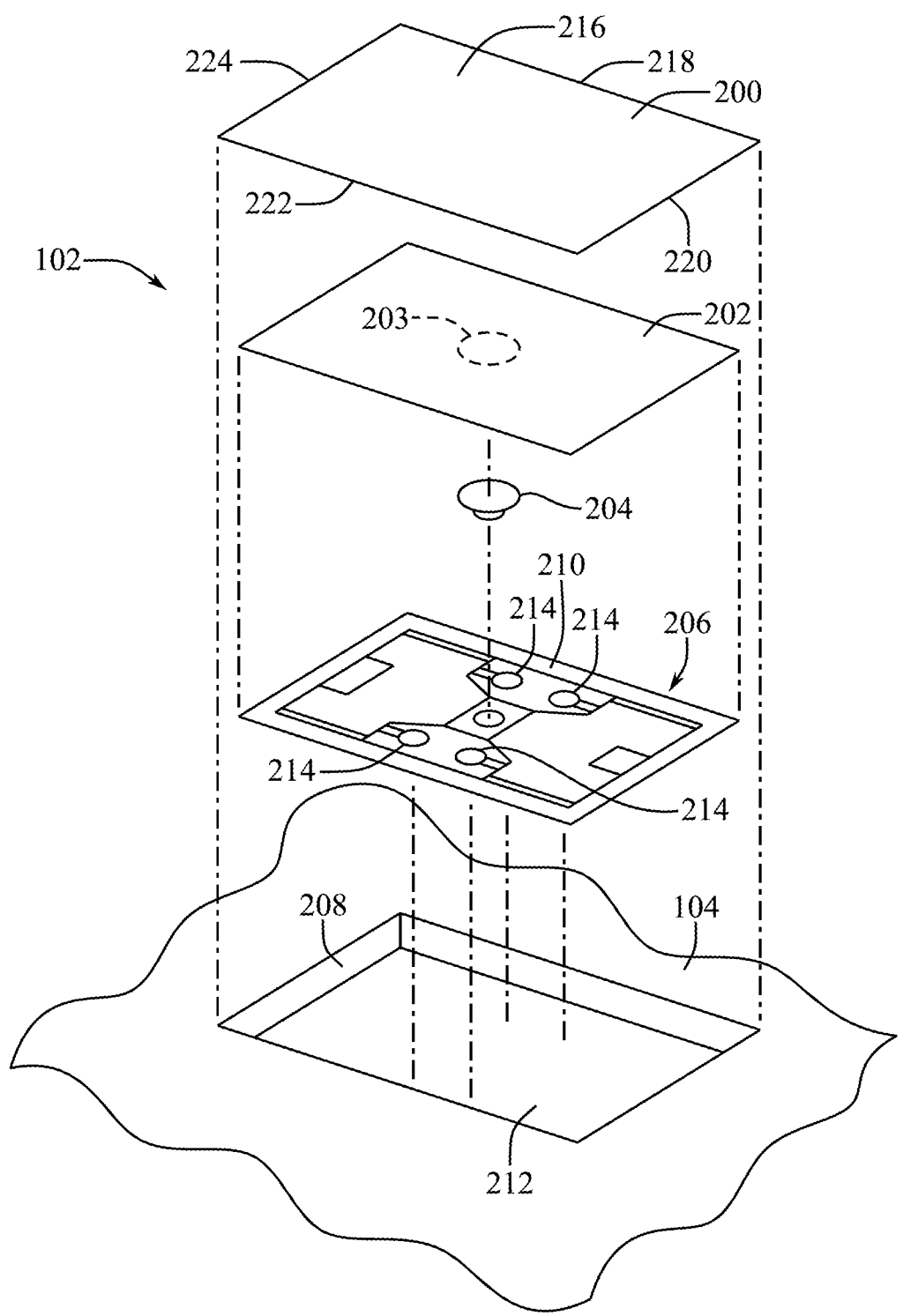
FIG. 2 shows an exploded view of the input device and enclosure portion of the computing system of FIG. 1.

The input device 102 can be a touch sensitive pointing and gesture device such as a trackpad or touch pad. FIG. 2 shows an exploded view of the input device 102 and a portion of the lower enclosure 104. The input device 102 can comprise a cover or top plate 200, a touch sensor 202, a switch 204, and a support mechanism 206 in a layered assembly that is positioned in an opening 208 in the lower enclosure 104. The cover 200 can be positioned above (i.e., vertically external to) the touch sensor 202, the switch 204 can be positioned between the touch sensor 202 and the support mechanism 206, and the support mechanism 206 can be attached to the cover 200 or touch sensor 202 at an outer edge (e.g., around frame 210) and to a base surface 212 of the lower enclosure 104 at a set of attachment points 214 on the support mechanism 206.

The cover 200 can comprise a substantially planar piece of rigid material. The top surface 216 of the cover 200 can be configured to come into contact with and touch one or more user objects (e.g., a finger, stylus, or similar pointing object) as the input device 102 is operated. Thus, in various cases a user can provide input against the top surface 216 by tapping, sliding, rubbing, pressing downward against, or otherwise applying a force to the top surface 216 using one or more user objects/pointing objects. The cover 200 can comprise a rigid material such as ceramic, glass, metal, a rigid polymer, a composite material (e.g., a fiber-reinforced composite), related materials, or combinations thereof. Thus, the cover 200 can have sufficient stiffness to be resistant to flexing, curving, or bending when a downward force is applied to the top surface 216. The top surface 216 can be flat and smooth or provided with a relatively rough texture in order for the cover 200 to have a desired aesthetic appearance (e.g., to make it appear similar to the surrounding lower enclosure 104) or to manage the amount of surface friction produced when the user object comes into contact (e.g., tap, holding, or sliding contact) with the top surface 216. The cover 200 can have a substantially rectangular shape, such as, for example, the shape of a rectangle with four outer edges 218, 220, 222, 224. Each outer edge (e.g., 218) can be oriented substantially perpendicular to its two adjoining edges (e.g., 220, 224 corresponding to edge 218). In some embodiments, the corners of the cover 200 can be rounded or otherwise truncated where the outer edges 218, 220, 222, 224 meet. The shape of the cover 200 can alternatively be round, triangular, hexagonal, or another similar basic shape for receiving touch input.

The touch sensor 202 can be positioned under the cover 200. In some embodiments, the touch sensor 202 is part of the cover 200. Thus, a touch plate or cover can comprise the cover 200 and touch sensor 202 of FIG. 2. The touch sensor 202 can comprise a substrate (e.g., a printed circuit board (PCB)) or a similar electronic component connected to a touch sensor matrix or array for detecting a user touch on the top surface 216. For example, the touch sensor 202 can comprise a capacitive touch sensor configured to sense a change in capacitance at the top surface 216 in response to the presence or contact of a user object with the top surface 216. In some embodiments, the touch sensor 202 can comprise a resistive touch sensor or similar device configured to detect a touch based on a change in resistance in the touch sensor 202 caused by application of a force to the top surface 216. The touch sensor 202 can therefore be used to detect a touch, tap, sliding movement, or other type of user input against the top surface 216 and can further detect a position of the user input in two dimensions (e.g., a left/right position relative to the width of the cover 200 and a front/back position relative to the length of the cover 200).

The touch sensor 202 can be mounted to a bottom surface of the cover 200 and can therefore move with the cover 200 as the cover 200 translates relative to the lower enclosure 104. This can beneficially ensure that the distance between the top surface 216 and the touch sensor 202 remains consistent as the cover 200 moves. In some embodiments, the touch sensor 202 can comprise a touch sensor array that moves with the cover 200 and that array is connected to a sensor controller (e.g., a PCB) that is positioned remote from the cover 200 and not movable with the cover 200 (e.g., in the lower or upper enclosures 104, 110). The touch sensor 202 can extend across substantially the entire underside of the cover 200, and in some cases, the touch sensor 202 can cover only a portion of the underside of the cover 200. Thus, the support mechanism 206 can be mounted to the bottom of the cover 200 or to the touch sensor 202, depending on the size of the touch sensor 202 and its positioning on the cover 200.

The switch 204 can comprise a deflectable member configured to change shape as the cover 200 moves relative to the base surface 212. In some configurations, the switch 204 is a collapsible or compressible structure, wherein the switch 204 collapses or compresses upon application of a force to the switch 204 by the support mechanism 206, base surface 212, cover 200, or touch sensor 202. For example, the switch 204 can comprise a bistable flexible dome configured to collapse and buckle from a first stable shape to a second stable shape upon compression. The switch 204 can therefore provide resistance to compression (i.e., force feedback) to the user that follows a curved, tactile force versus displacement profile. In some embodiments, the switch 204 can have a force versus displacement profile wherein the force increases in a manner directly related to an increase in compression of the switch 204 until an initial peak in force is reached, at which time the force decreases as the compression of the switch increases. At the inflection point, the switch 204 can begin to transition from its first stable configuration to its second stable configuration. Afterward, the force versus displacement profile can reach a local minimum that then transitions to increasing again toward infinity as the switch 204 continues to be compressed. The switch 204 can be referred to as having tactility or a "tactile event" in the force versus displacement profile due to the drop in force between the peak inflection point and the local minimum force. This feedback can be discerned by the user as a "drop" or "click" in the cover 200 as the switch 204 buckles during compression. In some cases, the switch 204 can provide non-tactile or linear resistance, wherein no "click" or "tactile event" is present in its force versus displacement profile.

In some embodiments, the switch 204 can comprise a flexible, resilient, and durable material such as a rubber or flexible metal. The switch 204 can also comprise a conductive material, wherein collapsing the switch 204 closes a circuit or otherwise generates an electrical signal indicating that the switch 204 has been actuated. The switch 204 can therefore provide tactility, an electrical signal indicating that the cover 200 has moved or been actuated, or both tactility and the electrical actuation/cover-moving signal. The switch 204 can comprise an elastically compressible material, wherein the switch 204 can bias the cover 200 and touch sensor 202 upward (i.e., away from the base surface 212) when the switch 204 has been compressed. In some embodiments, the support mechanism 206 can comprise flexures having an inherent upward bias configured to urge the cover 200 and touch sensor 202 upward. The switch 204 can be centrally located on the bottom of the touch sensor 202, as indicated by position 203 in FIG. 2.

The lower enclosure 104 can comprise a body for supporting the input device 102. To this end, the lower enclosure 104 can comprise a rigid construction such as surfaces comprising rigid metals, polymers, composite materials, ceramic materials, other similar materials or combinations thereof. In some embodiments, the lower enclosure 104 can include a substrate or electronic component to support the input device 102. The rigid construction can help ensure that the attachment points 214 of the support mechanism 206 remain stationary as the cover 200 moves. The opening 208 in the lower enclosure 104 can contain the input device 102 and can be slightly larger than the cover 200 to allow the cover 200 to move relative to the top of the opening 208. See FIGS. 5 and 6. The depth of the opening 208 can correspond to the combined thickness of the cover 200, touch sensor 202, switch 204, and support mechanism 206. In some embodiments, an outer layer can overlay the opening 208 and the cover 200 in a manner concealing the presence of the opening 208 in the lower enclosure 104. In some embodiments, the outer layer can bridge gaps between the cover 200 and the lower enclosure 104 to prevent ingress of particles or fluids between the edges of the cover 200 and the opening 208 or to provide a different aesthetic appearance.

Figure 3:
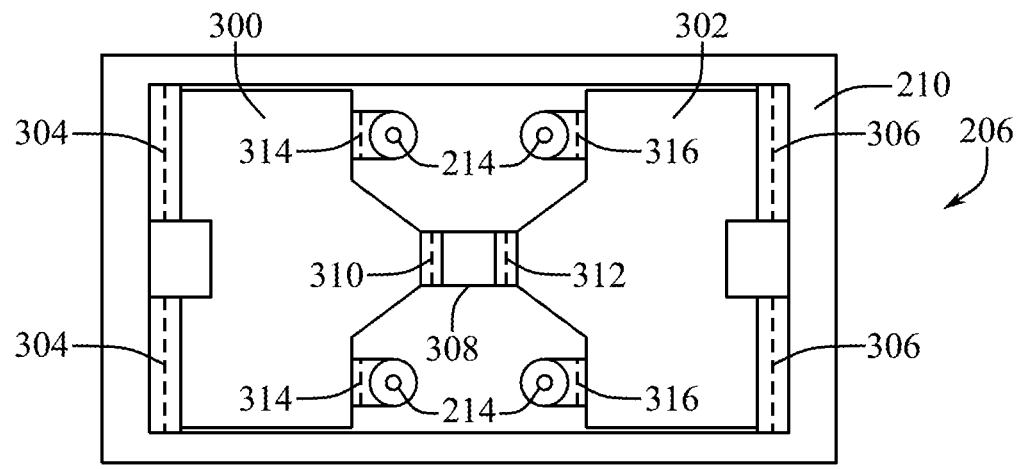
FIG. 3 shows a top view of a support mechanism.

The support mechanism 206 can be a linkage for synchronizing and parallelizing the movement of opposite sides of the cover 200 and touch sensor 202 as they translate relative to the base surface 212. The support mechanism 206 can also be used to apply a force to the switch 204, increase the rigidity of the cover 200 or touch sensor 202, and anchor the input device 102 to the lower enclosure 104. FIG. 3 shows a top view of the support mechanism 206 isolated from the rest of the input device 102. The support mechanism 206 can comprise a frame 210 extending around the perimeter of the support mechanism 206 and surrounding a pair of wings 300, 302 that are joined to the frame 210 at a pair of outer rotatable connections 304, 306. In some embodiments, the frame 210 is part of the cover 200 or touch sensor 202 instead of the support mechanism 206. The pair of wings 300, 302 are joined to each other at a central joint 308 by two inner rotatable connections 310, 312. The wings 300, 302 are also joined to the attachment points 214 by a set of middle rotatable connections 314, 316 that are positioned between the outer and inner rotatable connections 304, 306, 310, 312 of each respective wing 300, 302. Each wing 300, 302 can be respectively connected to two middle rotatable connections 314, 316. A pair of the middle rotatable connections 314 can be aligned with each other along an axis that is parallel to an axis of rotation defined by the outer rotatable connections 304.

The rotatable connections 304, 306, 310, 312, 314, 316 can each comprise a flexible, bendable, or pivotable hinge joint configured to flex, bend, or pivot in response to forces applied to the top surface 216 of the cover 200 and reactive forces applied to each of the wings 300, 302 by the attachment points 214, switch 204, central joint 308, and the other wing, as explained in further detail in connection with FIGS. 5 and 6 elsewhere herein. In order to enable rotation, flexing, bending, and pivoting at the rotatable connections 304, 306, 310, 312, 314, 316, the support mechanism 206 can comprise a joint element at each rotatable connection.

In some embodiments, a rotatable connection can comprise a joint element including a pivotable hinge, such as a pin-in-tube (i.e., "door hinge"). For example, an outer rotatable connection 304 can comprise a connection between the frame 210 and the wing 300 that comprises a set of pins extending from the frame 210 into a corresponding set of recesses or apertures in the wing 300 on each side of the wing 300, or vice versa, and the wing 300 can therefore pivot relative to the frame 210 at the outer rotatable connection 304 by rotation of the pins within the recesses.

In some embodiments, a rotatable connection can comprise a joint element including a bendable or flexible hinge, such as a living hinge that resiliently bends. For example, the frame 210 and wing 300 can comprise a piece of connective material that is elastically bendable or flexible along an outer rotatable connection 304, and the wing 300 can therefore rotate relative to the frame 210 by bending or flexing at the connective material.

Figure 4:
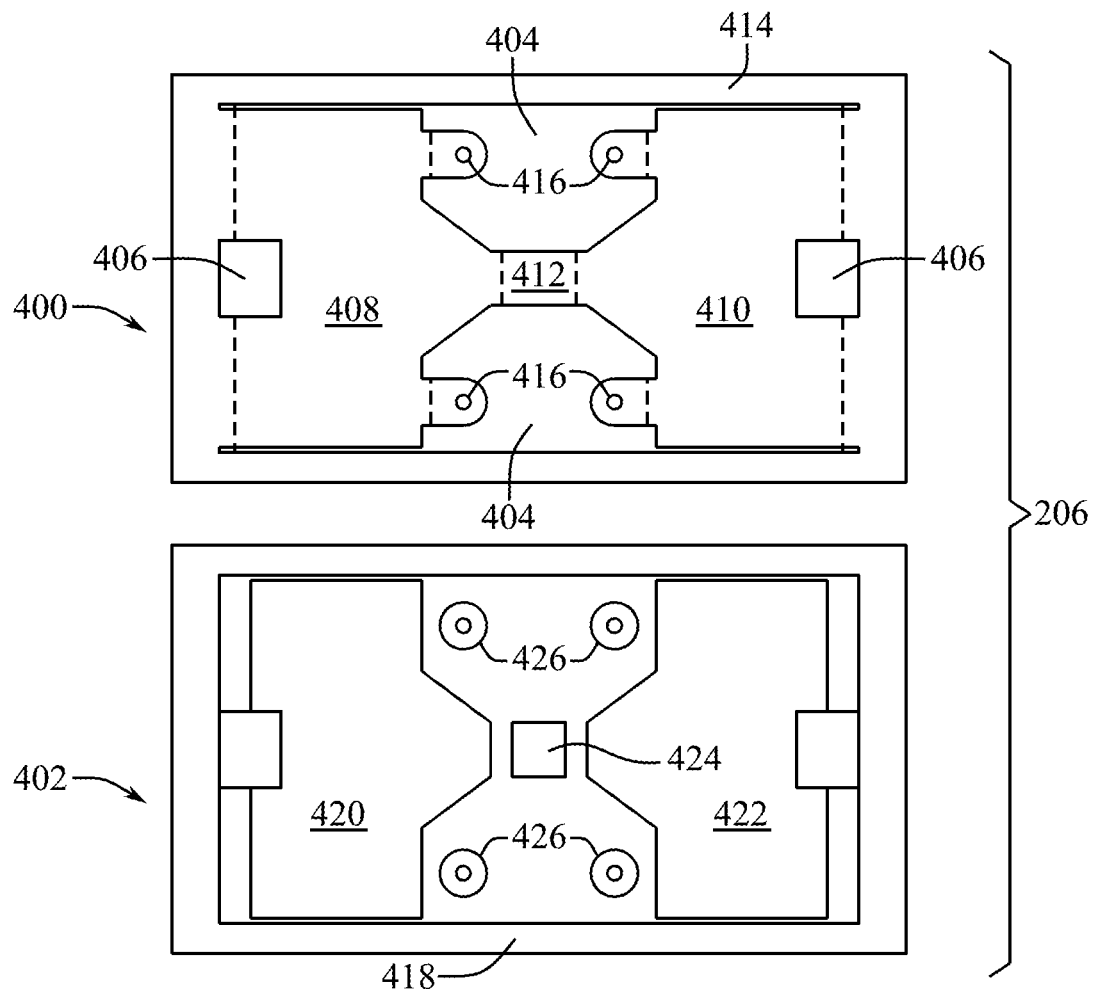
FIG. 4 shows a diagram of parts of the support mechanism of FIG. 3.

The joint elements at each of the rotatable connections 304, 306, 310, 312, 314, 316 can comprise a pivotable hinge or a bendable or flexible hinge. For example, the outer rotatable connections 304, 306 can be bendable hinges, and the inner and middle rotatable connections 310, 312, 314, 316 can be pivotable hinges. In the embodiment of FIGS. 3 and 4, the support mechanism 206 can have rotatable connections 304, 306, 310, 312, 314, 316 that are all bendable or flexible hinges.

FIG. 4 is an exploded view of the parts assembled into the support mechanism 206 of FIG. 3. As shown in FIG. 4, the support mechanism 206 can comprise a flexible sheet layer 400 and a reinforcement layer 402 comprising a set of reinforcement parts configured to be attached to the flexible sheet layer 400. The flexible sheet layer 400 can comprise a single layer of an elastically bendable material such as a metal or a polymer material (e.g., stainless steel or spring steel). The flexible sheet layer 400 can be stamped or machined to have a set of openings 404, 406 that define wings 408, 410, a central joint 412, a frame 414, and attachment point connections 416. The openings 404 can permit the wings 408, 410 and central joint 412 to move relative to the frame 414 (e.g., in a direction perpendicular to the page in FIG. 4 along the rotatable connections indicated by broken lines or along axis Z in FIG. 5).

In some embodiments, the flexible sheet layer 400 may comprise a material that is too flexible to properly transfer force from the end of one wing 408 to the opposite end of the flexible sheet layer 400 at the end of the other wing 410. The flexible sheet layer 400 can therefore be selectively reinforced, stiffened, and rigidized by the parts of the reinforcement layer 402. The reinforcement layer 402 can comprise a frame reinforcement 418, wing reinforcements 420, 422, a central joint reinforcement 424, and attachment point reinforcements 426. FIG. 3 shows where the elements of the reinforcement layer 402 are attached to the flexible sheet layer 400. Where these reinforcement elements are attached to the flexible sheet layer, the flexible sheet layer can have reduced flexibility that allows the wings 408, 410 to act as substantially rigid levers and allows the frame 414 to act as a substantially rigid frame. In this manner, the support mechanism 206 can bend and can be flexible at the rotatable connections 304, 306, 310, 312, 314, 316 while still having limited bending between the rotatable connections 304, 306, 310, 312, 314, 316. For example, the support mechanism 206 can have a high yield-to-modulus ratio where the reinforcement layer 402 elements are located.

In some embodiments, the reinforcement layer 402 can be welded, stamped, adhered, co-molded, or otherwise attached to or formed with the flexible sheet layer 400. In various cases, the reinforcement layer 402 and flexible sheet layer 400 can comprise different materials, similar or the same materials having different thicknesses, hardnesses, or other properties affecting bending and stiffness properties. In some embodiments, the frame reinforcement 418 can be part of the support mechanism 206, and in some cases, the frame reinforcement 418 can be part of the cover 200 or touch sensor 202. In some embodiments, the frame 210 is a separate part from the wings 300, 302 that is attached to the wings 300, 302 by separate pivotable or unlocking parts at the outer rotatable connections 304, 306.

In one embodiment, the functions of the flexible sheet layer 400 and the reinforcement layer 402 can be performed by a single layer, wherein the flexibility of the single layer is selectively increased along the locations of the rotatable connections 304, 306, 310, 312, 314, 316. For example, the flexibility can be increased by reducing the thickness of the single layer along the rotatable connections 304, 306, 310, 312, 314, 316 or by cutting, machining, forging, or otherwise forming aligned apertures along the rotatable connections to increase their flexibility.

The openings 406 aligned with the outer rotatable connections 304, 306 can be positioned in the flexible sheet layer 400 to increase flexibility of the flexible sheet layer 400 at the outer rotatable connections 304, 306 and to reduce weight and size of the wings 408, 410. The size of the openings 406 can be designed to increase or decrease the amount of force required to bend the wings 300, 302 relative to the frame 210 at the outer rotatable connections 304, 306, wherein larger openings 406 decrease the amount of force by reducing the lengths of the rotatable connections 304, 306 and smaller openings 406 increase the amount of force by increasing the lengths of the rotatable connections 304, 306, particularly when the rotatable connections 304, 306 are flexures instead of pivot joints.

Figure 5:
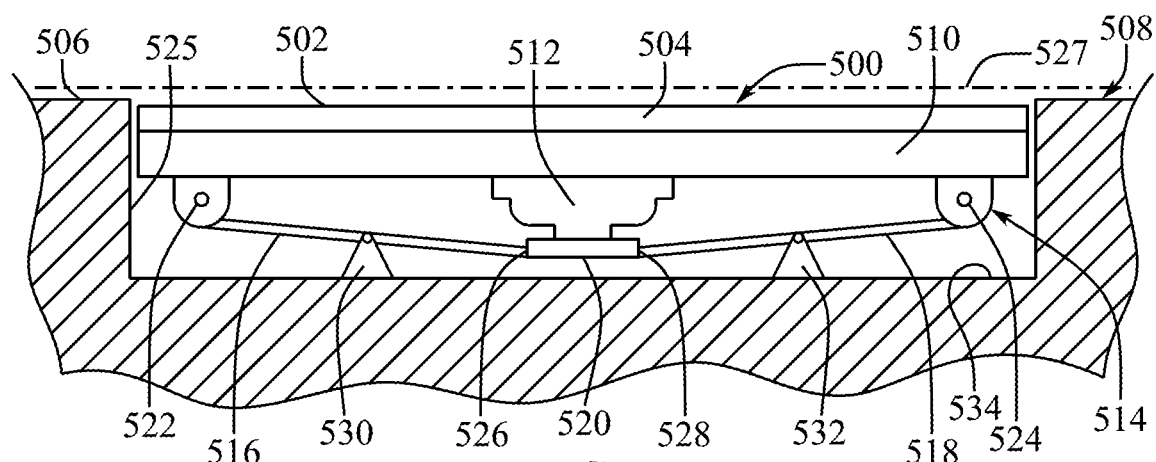
FIG. 5 shows a diagrammatic side view of an input device in an enclosure in a raised position.

FIG. 5 shows a diagrammatic side view of an input device 500 illustrating the function of a parallel motion trackpad similar to the input device 102 of FIG. 2. Accordingly, parts with similar names in input devices 102 and 500 can have similar functions and capabilities. This input device 500 is shown with exaggerated scale and dimensions to improve visibility of the interaction of parts. In FIG. 5, the input device 500 is at a default, rest position. The position of FIG. 5 can also be referred to as a raised or unactuated position or configuration. In this position, the top surface 502 of the cover 504 is substantially horizontally aligned with a surrounding surface 506 of the enclosure 508. The touch sensor 510 is attached to the bottom of the cover 504. A switch 512 is attached to the touch sensor 510 and is compressible between the touch sensor 510 and a support mechanism 514. The support mechanism 514 can include wings 516, 518 with a central joint 520 in contact with the switch 512. Outer rotatable connections 522, 524 provide a rotatable link between the wings 516, 518 and the touch sensor 510 or cover 504, inner rotatable connections 526, 528 provide a rotatable link between the wings 516, 518 and the central joint 520, and middle rotatable connections 530, 532 provide a rotatable link between the wings 516, 518 and the base surface 534. While in the position of FIG. 5, the switch 512 can provide a biasing force that urges apart the central joint 520 and the touch sensor 510. Due to the positioning of the middle rotatable connections 530, 532 being spaced away from the base surface 534 (i.e., there is open area below and between the middle rotatable connections 530, 532), the central joint 520 is positioned below and between the middle rotatable connections 530, 532. The biasing force applied to the central joint 520 urges the central joint 520 in a downward direction which in turn causes the wings 516, 518 to rotate about the middle rotatable connections 530, 532 to move the outer rotatable connections 522, 524 upward.

In some embodiments, as shown in FIG. 5, the input device 500 can be mounted to the base surface 534. The input device 500 can be only mounted to the base surface, meaning it is not affixed or connected to any other lateral side surfaces (e.g., the vertical sides of the opening 525 of the enclosure 508). In some embodiments, a top layer (e.g., 527) can enclose the cover 504 within the opening 525 and can bridge the gaps or cracks between the cover 504 and the surrounding surface 506 of the enclosure 508. In either case, the support mechanism 514 and all rotatable connections for the input device 500 can be below the cover 504 (i.e., between the cover 504 and the base surface 534) unlike a hinge for a "diving board" style trackpad or other similar device.

While in the position of FIG. 5, the biasing force of the switch 512 can be sufficient to prevent the weight of the cover 504 and touch sensor 510 from collapsing the switch 512, thereby keeping the support mechanism 514 from pivoting, flexing, or bending. The top surface 502 can therefore remain stationary in this position when no input is being provided to the input device 500. Additionally, the biasing force of the switch 512 can prevent the top surface 502 from translating downward, even when a downward force is applied to the top surface 502, unless the force applied to the top surface exceeds a minimum vertically-oriented threshold magnitude. Thus, the downward force must exceed the minimum threshold for the switch 512 to begin to noticeably compress and deflect, thereby allowing the top surface 502 to move in response to the downward force. In this manner, the input device 500 can be used as a trackpad to receive light touches, taps, sliding contact gestures, and similar inputs on the top surface 502 without triggering the tactile deflection of the switch 512. In some embodiments, an independent biasing member (e.g. a spring) can be positioned under the input device 500 in conjunction with, or independent of, the switch 512.

Figure 6:
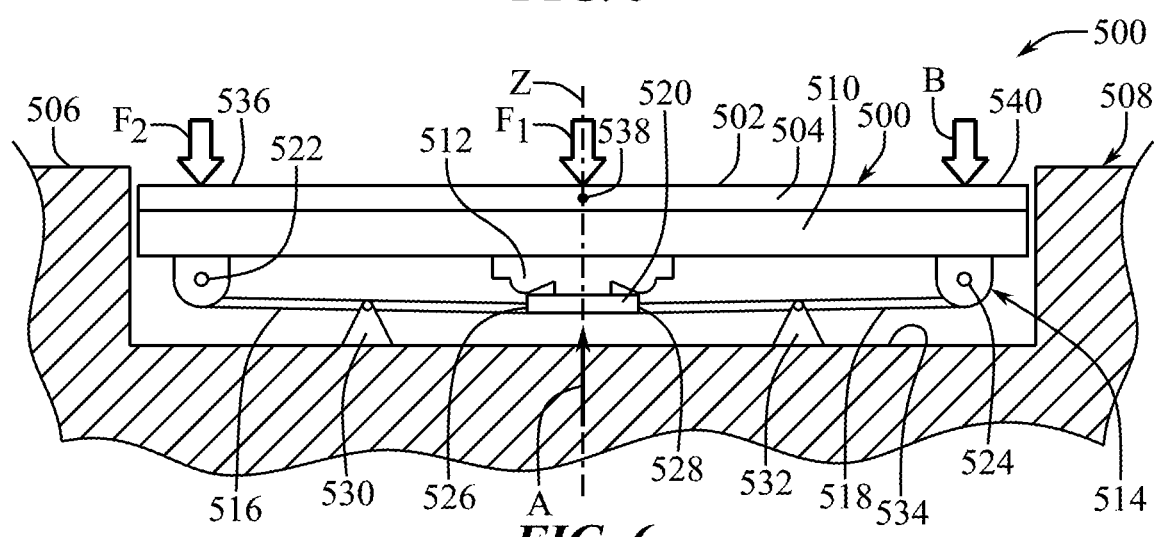
FIG. 6 shows a diagrammatic side view of the input device of FIG. 5 in a lowered position.

As shown in FIG. 6, which is another diagrammatic side view of the input device 500, a downward-oriented force $F_1$ can be applied to the top surface 502. The downward-oriented force $F_1$ can be applied by a user object pressing into the top surface 502, such as when a user intends to provide a "click" input to the input device 500. The downward-oriented force $F_1$ can have a magnitude sufficient to overcome the minimum threshold required to cause significant deflection (e.g., buckling) of the switch 512. As a result of the application of this force $F_1$, the cover 504 and touch sensor 510 can be pushed downward along a central longitudinal axis Z of the input device 500. The movement of the cover 504 and touch sensor 510 can move the outer rotatable connections 522, 524 downward, thereby inducing rotation of the wings 516, 518 about the middle rotatable connections 530, 532. The inner rotatable connections 526, 528 can also rotate, thereby driving the central joint 520 upward along arrow A in a direction parallel to (or aligned with) the central longitudinal axis Z. The switch 512 compresses or buckles, thereby actuating the switch 512 or another sensor. In some embodiments, a switch (which may or may not be switch 512) is configured to actuate upon sufficient deflection of the cover 504 relative to the base surface 534. A signal can be produced upon actuation of the switch 512, and that signal can be sent to a controller (e.g., a computer processor, input device processor, or other connected controller device) that a depression of the input device 500 has been detected. In some embodiments, the depression of the input device 500 is interpreted as a "click" for a pointing device.

Still referring to FIG. 6, an off-axis or off-center downward-oriented force $F_2$ can be applied to the top surface 502. In this case, the force $F_2$ can have a magnitude sufficient to overcome a minimum threshold required to cause significant deflection of the outer side 536 of the cover 504. If the support mechanism 514 were omitted and only a switch 512 were positioned underneath the center of the cover 504, this force $F_2$ would cause the cover 504 to rotate and tilt at its center point 538 on the central longitudinal axis Z. As a result, the force $F_2$ could potentially fail to compress the switch 512 sufficient to cause actuation of the switch (e.g., buckling of the switch), and the force $F_2$ could therefore fail to be registered as a click or similar input on the cover 504. Additionally, the off-center force $F_2$ could require the user to provide a much greater force $F_2$ than force $F_1$ in order to compress and actuate the switch 512 due to the off-center force $F_2$ being a greater distance from the switch 512. However, because the support mechanism 514 is present, the force $F_2$ is transferred through the wings 516, 518 and central joint 520 to cause the switch 512 to compress upward (along arrow A) and to cause the opposite outer side 540 of the cover 504 to move downward (along arrow B). The wing 516 nearest to the location of the application of force $F_2$ is driven downward at the outer rotatable connection 522 while being driven upward at the inner rotatable connection 526. Further, the opposite wing 518 is driven upward at the inner rotatable connection 528 and downward at the outer rotatable connection 524. This substantially prevents the cover 504 from rotating about its center point 538 and ensures that the top surface 502 remains parallel to the base surface 534 or surrounding surface 506 as it moves in response to the force $F_2$.

In some embodiments, the wings 516, 518 and cover 504 are not perfectly stiff and therefore slightly bend in a manner that causes the vertical translation of the outer side 536 to be slightly different than the vertical translation at the center point 538 or the opposite outer side 540. Additionally, the support mechanism can have losses in its rotatable connections. However, the magnitude of vertical translation (i.e., translation parallel to the central longitudinal axis Z) can be substantially equal at all three areas 536, 538, 540. In some embodiments, the magnitude of vertical translation at each area can be within 10 percent of each other.

Figure 7:
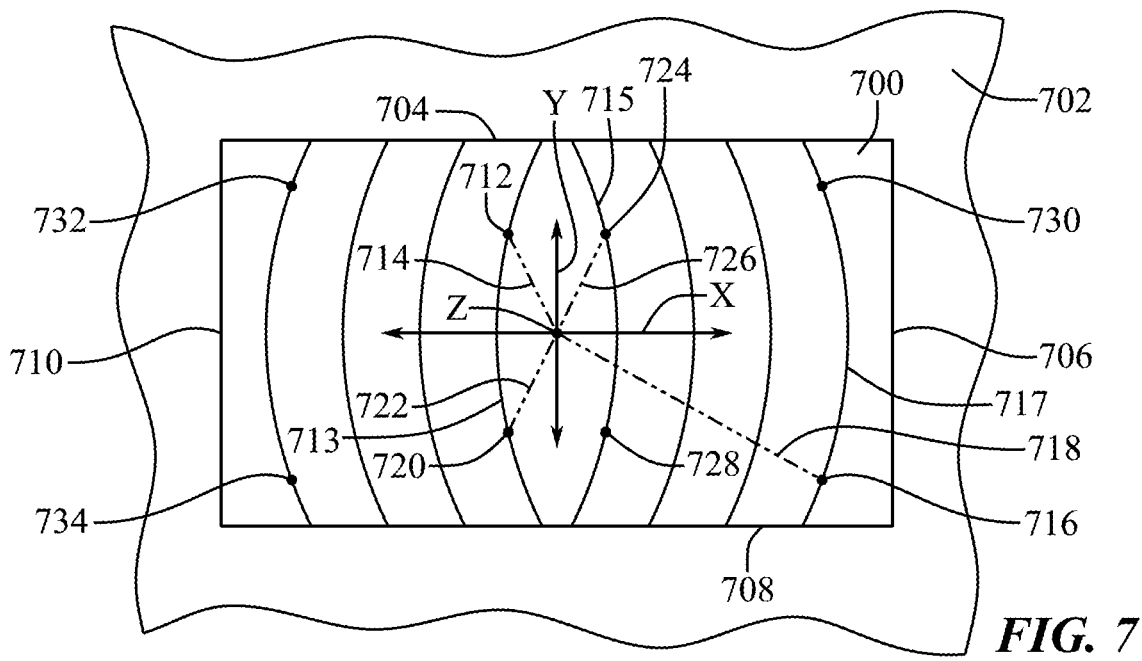
FIG. 7 shows a diagrammatic top view of a cover and enclosure portion of a computing system.

FIG. 7 shows a top view of a cover 700 positioned in an enclosure 702. In this figure, parts and features having similar names to the parts and features of the above-described embodiments of the present disclosure can have similar functions and characteristics. When a downward force is applied to the cover 700, it can therefore translate into the page relative to the enclosure 702 (i.e., parallel to central longitudinal axis Z, shown as a point in FIG. 7). The cover 700 can have four outer edges 704, 706, 708, 710 arranged in a rectangular shape. Due to operation of a support mechanism beneath the cover 700 (e.g., a support mechanism 206 or 514), the cover 700 can be stabilized against rotation when a downward force is applied to its top surface, even when the downward force is applied off-center along the X-axis and/or the Y-axis. For example, a downward force applied at a first point 712 that is a first distance 714 from the central longitudinal axis Z (i.e., the axis of motion of the cover 700) can deflect the entire cover 700 a substantially equal amount of deflection. Similarly, a downward force applied at a second point 716 that is a second distance 718 from the central longitudinal axis Z can deflect the entire cover 700 a substantially equal amount of deflection relative to the deflection caused at the first point 712.

Furthermore, the amount of force input required to deflect the cover 700 can vary depending on the distance across the cover 700 from the central longitudinal axis Z (i.e., primarily along axis X). This variation can be caused by minor losses in the bending or yielding of the cover 700 and support mechanism. Accordingly, the force required to overcome a threshold actuation bias of a switch or other biasing member positioned centrally beneath the cover 700 (i.e., the switch-triggering force or threshold actuation force) can be lowest at the central longitudinal axis Z, higher at the first point 712, and higher still at the second point 716 since the first point 712 and second point 716 are spaced away from the central longitudinal axis Z to different degrees. The curved series of lines (e.g., 715) emanating from the center of the cover 700 in FIG. 7 represent lines along which a constant amount of downward force is required to trigger an actuation of the switch. Thus, the amount of force required to actuate the switch at the first point 712 is equal to the amount of downward force required at third point 720 that is the same distance 722 from the axis Z as the distance 714 of the first point 712 and both lie on the same curve 713. In some embodiments, the cover 700 can have constant-force profile lines that are substantially straight lines (i.e., lines from edge 704 to edge 708 instead of curves (e.g., 715)). In some embodiments, the straight lines can be vertical lines when viewed from above, and in some embodiments, the straight lines can be angled or V-shaped and mirrored across axis Y, with the broadened ends of the corresponding angled lines or V-shapes being at the top edge 704 or inverted (i.e., the broadened ends being at the bottom edge 708).

The amount of force required at each curved line in FIG. 7 increases from line to line in a manner that is directly proportional to the distance of the line from the central longitudinal axis Z. Thus, a switch-triggering downward force applied at the center of the cover 700 (i.e., at axis Z) can be lower than the amount of switch-triggering downward force required to be applied at first point 712 or second point 716, and the amount of force required at second point 716 can be greater than the amount required at first point 712. In an example embodiment, the switch-triggering force at axis Z can be about 180 to about 200 grams and the switch-triggering force at points 716, 730, 732, and 734 can be about 275 grams. Thus, the variation in the switch triggering force across the cover 700 can be within a range of about 110 grams or less. In another embodiment, the switch-triggering force at axis Z can be about 225 grams and the switch-triggering force at points 716, 730, 732, and 734 can be about 265 grams. Thus, in some embodiments, the range of variation can be about 40 grams or less. In some embodiments, the maximum switch triggering force on the cover can be up to about 20 percent higher, about 30 percent higher, about 50 percent higher, or up to about 100 percent higher than the minimum force required for switch triggering. These ranges of variation are significantly less than many conventional trackpads, where a maximum force at a "diving board" hinge side of the trackpad may be at least 200 percent higher, and in some cases is 500 percent higher or more, than the minimum switch-triggering force at the opposite side.

As shown in FIG. 7, the curvatures of the curved lines (e.g., 713) do not have centers of curvature at the axis Z and instead have centers of curvature laterally offset from the central longitudinal axis Z on axis X. Additionally, the curved lines shown in FIG. 7 are illustrative of different constant triggering force areas on the cover 700 but do not show all possible variations of the force profile lines. In other words, the amount of force required to trigger the switch can continuously vary between the central longitudinal axis Z and first point 712 and between each line spaced further away from the axis Z relative to the line on which the first point 712 is located. In this manner, the curved lines of FIG. 7 indicate an example subset of all possible points that lie along additional, independent curved lines that are positioned continuously and with infinite gradation between the lines shown in FIG. 7.

The third point 720 is also positioned at a distance 722 from the central longitudinal axis Z that is equal to the distance 714. As illustrated by this example and by the curved lines, the input force required to actuate the switch can be mirrored across the axis X. Furthermore, the downward force required to actuate the switch at point 712 can be mirrored across axis Y, wherein an equal amount of force is required to actuate the switch at a fourth point 724 which is on a curved line 715 that mirrors the line having points 712 and 720 across axis Y. In this manner, at least three points (e.g., 712, 720, 724) on the cover 700 that are each separated from the central longitudinal axis Z by an equal amount of distance (e.g., 714, 722, 726) can have an equal switch-triggering threshold force value. Similarly, in some embodiments, four points (e.g., 712, 720, 724, 728) can have equal switch-triggering threshold force values.

For the constant-force line 717 on which third point 716 is located, three other corresponding points 730, 732, 734 can be positioned on the cover 700 at which an equal amount of force is required to actuate the switch, and each of those points 730, 732, 734 can be spaced the same distance (i.e., 718) from the central longitudinal axis Z. As illustrated by these points 716, 730, 732, 734, the cover 700 can have four corners in which the switch-triggering threshold force is equal or substantially equal. Said another way, the cover 700 can have a first half (e.g., on one side of axis X in FIG. 7) that has a mirrored switch-triggering force threshold profile (as defined by the curved lines) as compared to the opposite half (e.g., on the other side of axis X). The same can be said of the cover 700 having a mirrored switch-triggering force threshold profile across axis Y. Therefore, in some embodiments, such as where the support mechanism is centered below the cover 700, the switch-triggering force threshold profile can be symmetrical across two centrally-located and perpendicularly-intersecting axes (e.g., X and Y), thereby causing each quadrant of the cover 700 to have a switch-triggering force profile that is a symmetric analog of the triggering force profiles the other quadrants of the cover 700. In other words, each quadrant can comprise a set of curved line profiles that is a horizontally flipped, vertically flipped, or horizontally and vertically flipped version of another quadrant when viewed from above.

In some embodiments, an edge 704 of the cover 700 can be positioned adjacent to another input device (e.g., keyboard 106), and the opposite edge 708 can be positioned adjacent to an outer edge or outer side of the enclosure 702. In this case, downward displacement of a keyboard-side portion of the cover 700 (next to edge 704) induces substantially equal vertical displacement of the outer-side portion of the cover 700 (next to edge 708). The keyboard-side portion can be oriented parallel to the outer-side portion of the cover 700.

Figure 8:
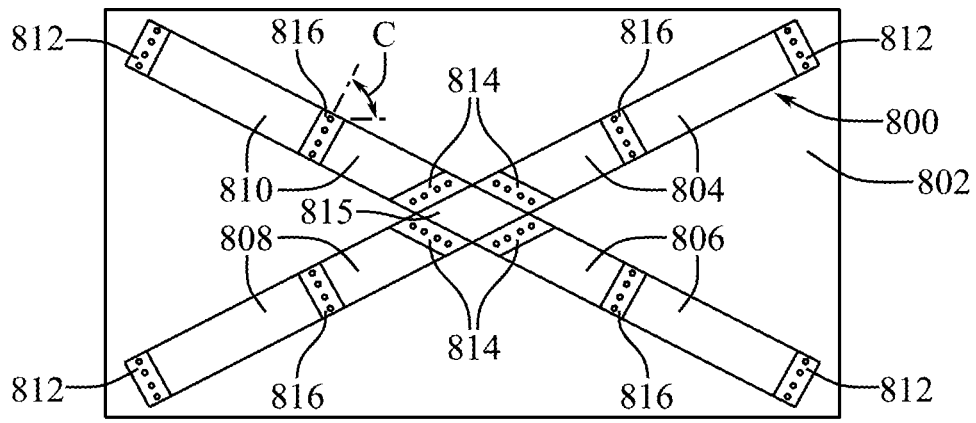
FIG. 8 shows a diagrammatic bottom view of a support mechanism and cover.

FIG. 8 shows another example embodiment of a support mechanism 800 positioned on an underside of a cover 802. In this figure, parts and features having similar names to the parts and features of the above-described embodiments of the present disclosure can have similar functions and characteristics. The support mechanism 800 can have four arms 804, 806, 808, 810 that each comprise an outer rotatable connection 812 to the cover 802, an inner rotatable connection 814 to a central joint 815, and a middle rotatable connection 816 to a base surface. The arms 804, 806, 808, 810 can be rigid across the middle rotatable connections 816.

The support mechanism 800 can have similar operation to other support mechanisms described herein, wherein downward force applied to the cover 802 is transferred via one or more outer rotatable connections 812 as an upward movement at the inner rotatable connections 814 and central joint 815 that causes downward movement of the other outer rotatable connections 812 and stationary rotation at the middle rotatable connections 816. In this embodiment, however, application of a force to one arm 804, 806, 808, 810 can be transferred to three other arms.

Furthermore, the rotatable connections 812, 814, 816 are all positioned at non-perpendicular angles (e.g., angle C) relative to the edges of the cover 802. Using non-perpendicular rotatable connections 812, 814, 816 can be beneficial in cases where the rotatable connections are pivoting hinges (e.g., barrel hinges/door hinges) that allow a small amount of axial translation of a pin in a receiving slot or tube. When such hinges are all aligned (e.g., all aligned with axis Y in FIG. 7), the cover 802 can move parallel to the axis of alignment (e.g., parallel to axis Y) in a manner that can cause vibration, shaking, or other unwanted deflection of the cover 802 while the user touches or presses into the surface of the cover 802. However, when the hinges of the rotatable connections 812, 814, 816 are not all aligned, movement of a pivoting portion of one hinge in one direction (e.g., along a direction aligned with one of the middle rotatable connections 816) can be restricted by mechanical interference in that direction between a pivoting portion of another of the same type of rotatable connections (e.g., another middle rotatable connection 816) and its receiving recess or slot. Accordingly, the non-aligned rotatable connections 812, 814, 816 can help limit unwanted lateral movement or noise caused by imprecision (e.g., dimensional tolerance variation) in pivoting hinges used for the rotatable connections.

Figure 9:
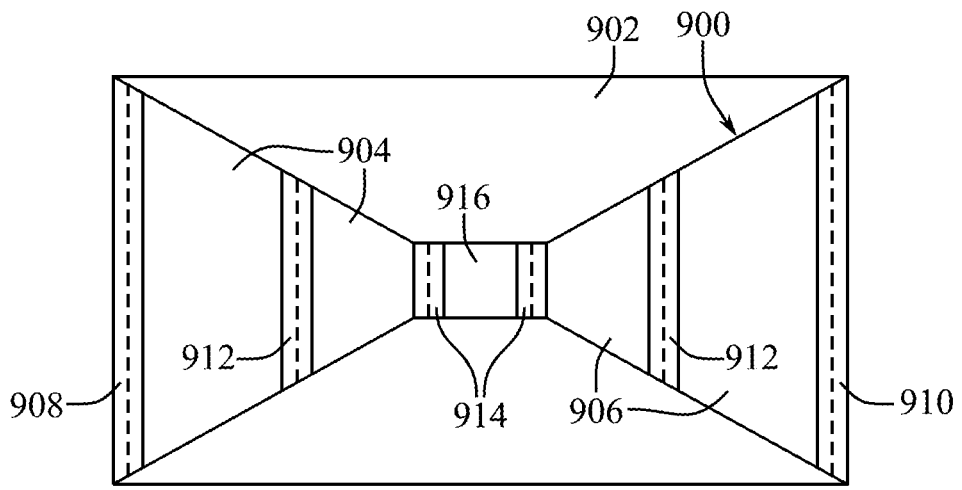
FIG. 9 shows a diagrammatic bottom view of another embodiment of a support mechanism and cover.

FIG. 9 shows yet another embodiment of a support mechanism 900 positioned on an underside of a cover 902. In this figure, parts and features having similar names to the parts and features of the above-described embodiments of the present disclosure can have similar functions and characteristics. The support mechanism 900 can have two wings 904, 906 positioned with outer rotatable connections 908, 910 at outer ends of the cover 902. The outer rotatable connections 908, 910 can be at the extreme edges of the cover 902 to increase the overall length of the wings 904, 906 and thereby increase the amount of deflection of the wings 904, 906 when the ends of the wings 904, 906 rotate about the middle rotatable connections 912. Inner rotatable connections 914 can join the wings 904, 906 to a central joint 916. In support mechanism 900, a single pair of middle rotatable connections 912 can be used as compared to the set of four middle rotatable connections 314 of support mechanism 206. See FIG. 3. The configuration of support mechanism 900 simplifies the shape and construction of the support mechanism due to a frame and more complex cuts or openings in the support mechanism 900 being omitted. This can be beneficial in cases where the stiffness of the wings 904, 906 needs to be maximized (e.g., a more flexible material is used for the wings 904, 906 as compared to other support mechanisms disclosed herein, so the wings are stiffened to compensate). The simplified shape can also beneficially reduce manufacturing and assembly costs.

Figure 10:
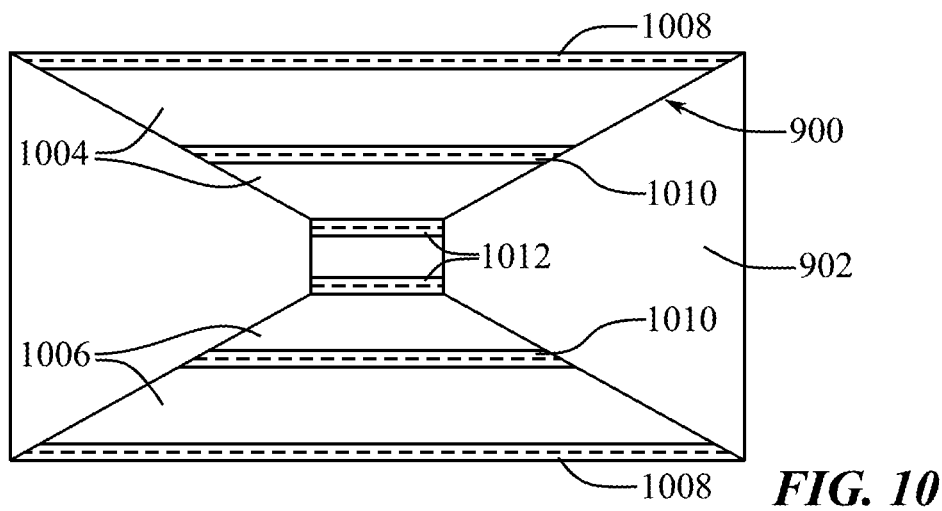
FIG. 10 shows a diagrammatic bottom view of another embodiment of a support mechanism and cover.

FIG. 10 shows another embodiment of a support mechanism 1000 positioned on an underside of a cover 1002. Here, the wings 1004, 1006 are oriented substantially 90 degrees rotated relative to support mechanism 900 so that the rotatable connections 1008, 1010, 1012 extend along the longer width dimension of the cover 1002 instead of the shorter width dimension. This embodiment further shows that the support mechanism 1000 can be adjusted to various orientations relative to the cover 1002 and that the pivot axes of the rotatable connections 1008, 1010, 1012 can be oriented parallel to the long width dimension of a rectangular cover 1002. This can be beneficial in applications where a user is expected to apply horizontal force against the cover 1002 in a direction parallel to the short width dimension of the rectangular cover 1002 since the rotatable connections 1008, 1010, 1012, being perpendicular to that direction, can be constructed with less rattle or loose displacement as the cover 1002 is manipulated. This configuration can also be beneficial in embodiments where stiffness in the rotatable connections 1008, 1010, 1012 is desirably maximized (e.g., when a more naturally flexible material is used for the wings 1004, 1006) since the lengths of the rotatable connections are large relative to other embodiments.

Figure 11:
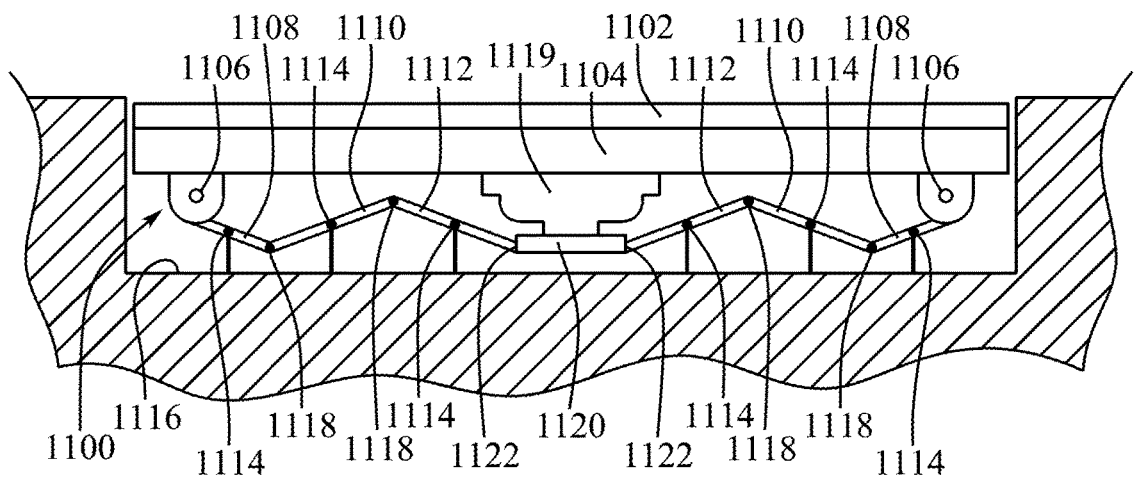
FIG. 11 shows a diagrammatic side view of an input device in an enclosure.

FIG. 11 shows another alternative embodiment of a support mechanism 1100 in a side view comparable to FIG. 5. In this case, the support mechanism 1100 can be attached to a cover 1102 and touch sensor 1104 at outer rotatable connections 1106 linked to a series of alternating arms 1108, 1110, 1112. The arms 1108, 1110, 1112 each have a middle rotatable connection 1114 coupled or grounded to a base surface 1116. A pair of intermediate connections 1118 join arms 1108 and 1110 on each side of a central joint 1120 with inner rotatable connections 1122. When the outer rotatable connections 1106 move downward, the arms 1108, 1110, 1112 all rotate and compress the switch 1119 at the central joint 1120. This support mechanism 1100 can enable the width of the cover 1102 and touch sensor 1104 to cover a greater distance while keeping the height of the support mechanism 1100 substantially equal to the height of other support mechanisms disclosed herein (e.g., 206). For input devices with very high width dimensions, additional sets of intermediate connections 1118 and arms can be added.

Figure 12:
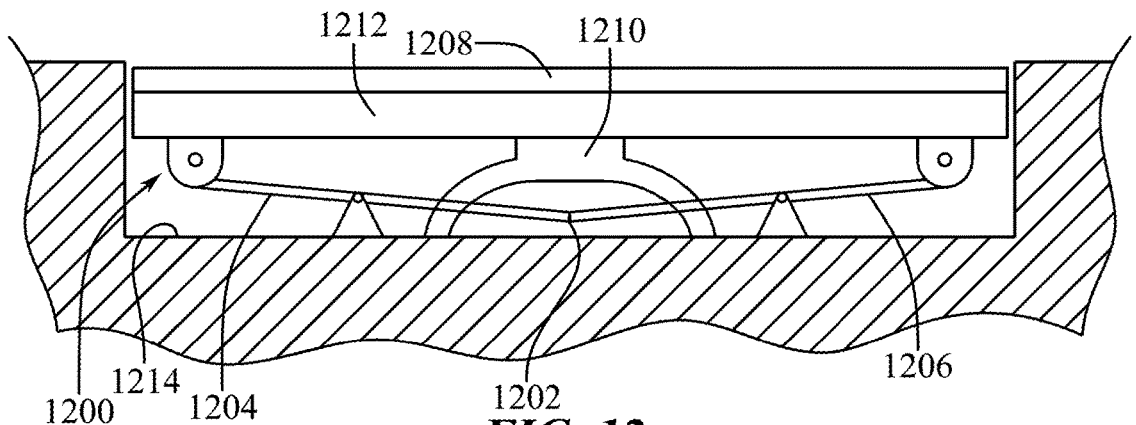
FIG. 12 shows a diagrammatic side view of another embodiment of an input device in an enclosure.

FIG. 12 shows another alternative embodiment of a support mechanism 1200 with a simplified construction in which a central joint is omitted and a single inner rotatable connection 1202 joins the wings 1204, 1206. In this embodiment, the wings 1204, 1206 can transfer forces across the cover 1208 to preserve parallel motion of the cover 1208. The wings 1204, 1206 can be horizontally offset from, and out of contact with, a switch 1210 under the cover 1208. Thus, movement of the cover 1208 and touch sensor 1212 relative to a base surface 1214 can compress the switch 1210 as it is pressed against the base surface 1214 instead of a central joint. The amount of compression displacement of the switch 1210 can be reduced as compared to embodiments having a central joint. For example, the switch 1210 can be displaced about half as much as a switch mounted between a central joint and touch sensor of an embodiment described above. Furthermore, in some embodiments, a switch 1210 can be configured to actuate and trigger a signal by contacting a conductor or sensor at the touch sensor 1212 upon collapse. In other cases, the switch 1210 can actuate by contacting a conductor or sensor at the base surface 1214 (e.g., on a substrate positioned below the touch sensor 1212). In other cases, the switch 1210 can merely provide a tactile feedback sensation and biasing force to the trackpad and can thus have no electrical function. In such cases, other sensors or switches (e.g., a force, displacement, or strain sensor) can be used to determine whether a user has provided a "click" input or similar input to the cover 1208. A switch with solely non-electrical function can be referred to as a tactile dome or biasing member. Other switches described herein (e.g., 204, 512, 1119) can have solely non-electrical function paired with an alternative "click" sensor as well.

Figure 13:
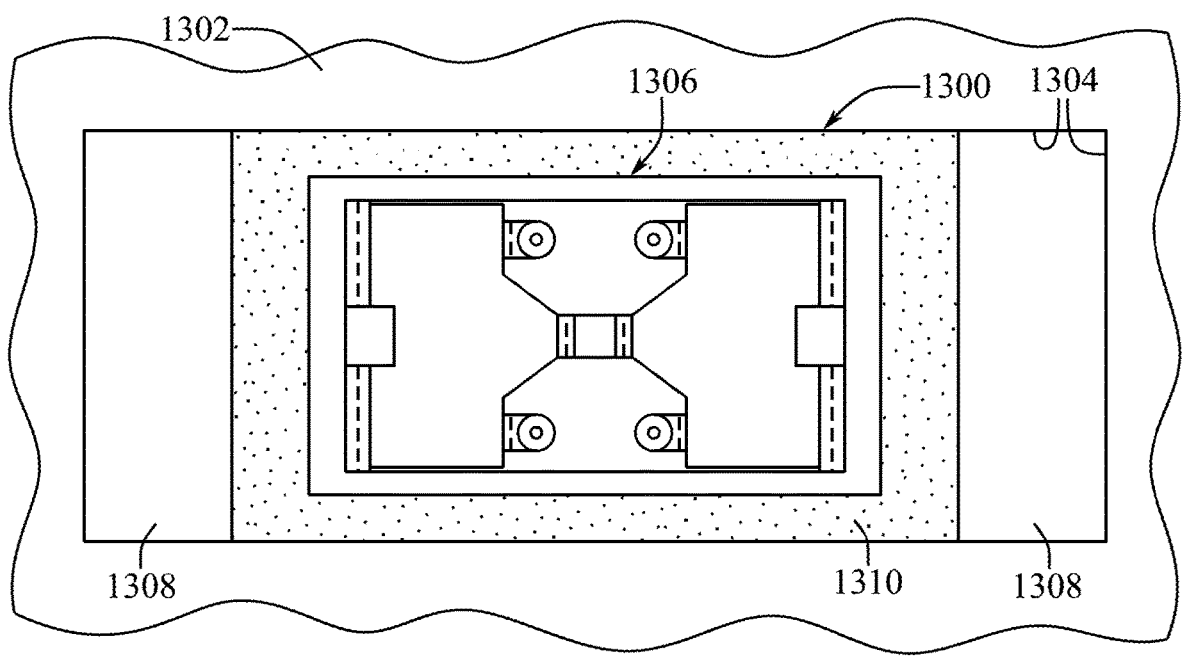
FIG. 13 shows a diagrammatic top view of an input device assembly and an enclosure portion.

FIG. 13 shows a top view of an input device 1300 positioned in an enclosure 1302, wherein the input device 1300 is in an opening 1304 of the enclosure 1302 that is significantly larger than the support mechanism 1306. In this case, the cover and touch sensor (both of which not shown, but would have properties similar to other covers and touch sensors described herein) can be sized substantially equal to the size of the opening 1304 and can overlay and cover the support mechanism 1306, a set of non-deflecting regions 1308, and a gap 1310 laterally between the support mechanism 1306 and the edges of the opening 1304 or the set of non-deflecting regions 1308 (shown as a dotted region). As a result, a touch input provided to the cover or touch sensor can be detected at any point within the two-dimensional area defined by the opening 1304, but when a downward force is applied to the non-deflecting regions 1308, the cover and touch sensor are prevented from deflecting downward or actuating movement of the support mechanism 1306. When a downward force is applied to the cover or touch sensor over the support mechanism 1306, the mechanism 1306 can actuate and downwardly translate a two dimensional central region of the cover and touch sensor with parallel motion. When a downward force is applied above the gap 1310, a greater force may be required, but the cover and touch sensor can deflect and bend in response to the force to actuate a switch beneath the support mechanism 1306. This input device 1300 therefore defines regions in which downward deflection is possible (e.g., over support mechanism 1306 and gap 1310) and regions in which downward deflection is not possible (e.g., over non-deflection regions 1308). This behavior of the input device 1300 can help to guide the user to provide a "click" input centrally on the cover and touch sensor while still allowing the user to use other parts of the input device 1300 to provide sliding or tapping input. Furthermore, this input device 1300 can help prevent accidental "click" inputs from being triggered when a user touches a portion of the cover and touch sensor that is not typically used for such inputs, such as in a palm rest area of a keyboard.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. An input device, comprising:
   a base enclosure;
   a plate; and
   a support mechanism including:
      a flexible sheet layer including a set of base attachments rotatably linking the flexible sheet layer to the base enclosure, a set of plate attachments linking the flexible sheet layer to the plate, and a set of rotatable connections, wherein the set of rotatable connections is positioned between a first base attachment and a second base attachment of the set of base attachments and between a first plate attachment and a second plate attachment of the set of plate attachments; and
      a reinforcement layer stiffening the flexible sheet layer and attached to the flexible sheet layer between the first base attachment and the first plate attachment.

2. The input device of claim 1, wherein the flexible sheet layer comprises a central joint positioned between the first base attachment and the second base attachment and between the first plate attachment and the second plate attachment.

3. The input device of claim 2, further comprising a reinforcement structure stiffening the central joint.

4. The input device of claim 1, further comprising a reinforcement structure stiffening the set of base attachments of the flexible sheet layer.

5. The input device of claim 1, wherein, in response to vertical displacement of a first end of the flexible sheet layer, the support mechanism vertically displaces a second end of the flexible sheet layer, the second end being positioned on the flexible sheet layer opposite the first end.

6. The input device of claim 5, wherein the reinforcement layer comprises a frame portion attached to the frame of the flexible sheet layer.

7. The input device of claim 1, wherein the flexible sheet layer includes a frame attached to the plate and an opening through the flexible sheet layer, the frame extending around the opening.

8. The input device of claim 1, wherein the flexible sheet layer defines a first wing and a second wing, and wherein the reinforcement layer includes a first portion stiffening the first wing and a second portion stiffening the second wing.

9. The input device of claim 1, further comprising a capacitive touch sensor attached to the plate.

10. The input device of claim 1, further comprising a switch positioned between the base enclosure and the plate.

11. The input device of claim 1, wherein the set of base attachments are positioned laterally internal to the set of plate attachments of the flexible sheet layer.

12. The input device of claim 1, wherein the set of rotatable connections bias the plate away from the base enclosure.

13. An electronic input device, comprising:
    a housing;
    a cover;
    a pivotable mechanism positioned between the cover and the housing, the pivotable mechanism including:
       a first wing including a first outer rotatable connection to the cover, a first inner rotatable connection to the housing, and a first stiffened portion between the first outer rotatable connection and the first inner rotatable connection; and
       a second wing including a second outer rotatable connection to the cover, a second inner rotatable connection to the housing, and a second stiffened portion between the second outer rotatable connection and the second inner rotatable connection.

14. The electronic input device of claim 13, further comprising a touch sensor attached to the cover, and a switch actuatable in response to displacement of the cover relative to the housing.

15. The electronic input device of claim 13, wherein the first wing is attached to the second wing at a central joint portion of the pivotable mechanism.

16. The electronic input device of claim 13, wherein the pivotable mechanism includes a frame surrounding and attached to the first wing and the second wing.

17. The electronic input device of claim 13, wherein the first wing is thicker at the first stiffened portion relative to the first outer rotatable connection.

18. An input device, comprising:
    a cover;
    a flexible layer including:
       a first end rotatably attached to the cover;
       a second end rotatably attached to the cover;
       a rotatable joint positioned between the first end and the second end;
       a first reinforced portion between the first end and the rotatable joint; and
       a second reinforced portion between the second end and the rotatable joint; and
    a switch biasing the rotatable joint away from the cover.

19. The input device of claim 18, wherein the first reinforced portion includes a flexible material is reinforced by a rigid material attached to the flexible material.

20. The input device of claim 18, wherein the flexible layer further comprises:
    a first attachment point positioned between the first end and the rotatable joint; and a second attachment point positioned between the second end and the rotatable joint.

\* \* \* \* \*